United States Patent
Mertens et al.

(10) Patent No.: US 12,279,547 B2
(45) Date of Patent: Apr. 22, 2025

(54) SOWING MACHINE HAVING INDIVIDUAL COULTER PRESSURE CONTROL

(71) Applicant: Amazonen-Werke H. Dreyer SE & Co. KG, Hasbergen (DE)

(72) Inventors: Daniel Mertens, Oldenburg (DE); Felix Warns, Berne (DE); Karl-Peter Hoffmann, Hude (DE); Marcus Oldenburger, Ganderkesee (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 809 days.

(21) Appl. No.: 17/413,737

(22) PCT Filed: Dec. 5, 2019

(86) PCT No.: PCT/EP2019/083793
§ 371 (c)(1),
(2) Date: Jun. 14, 2021

(87) PCT Pub. No.: WO2020/120276
PCT Pub. Date: Jun. 18, 2020

(65) Prior Publication Data
US 2022/0053688 A1    Feb. 24, 2022

(30) Foreign Application Priority Data
Dec. 14, 2018  (DE) .................. 10 2018 132 226.7

(51) Int. Cl.
*A01C 7/20*    (2006.01)
*A01B 79/00*   (2006.01)
*A01B 79/02*   (2006.01)

(52) U.S. Cl.
CPC ............ *A01C 7/205* (2013.01); *A01B 79/005* (2013.01); *A01B 79/02* (2013.01)

(58) Field of Classification Search
CPC ........ A01C 7/205; A01B 79/005; A01B 79/02
See application file for complete search history.

(56) References Cited

U.S. PATENT DOCUMENTS

| 7,938,074 B2 * | 5/2011 | Liu ................... A01C 5/068 |
| | | 111/194 |
| 8,380,356 B1 | 2/2013 | Zielke |
| | (Continued) | |

FOREIGN PATENT DOCUMENTS

EP    2 554 036 A1    2/2013

OTHER PUBLICATIONS

International Search Report issued Apr. 9, 2020 in corresponding PCT Application No. PCT/EP2019/083793.
(Continued)

*Primary Examiner* — Christopher J Sebesta
*Assistant Examiner* — Joel F. Mitchell
(74) *Attorney, Agent, or Firm* — Mintz Levin Cohn Ferris Glovsky and Popeo, P.C.

(57) ABSTRACT

A sowing machine has row units, where each of the row units includes tillage tools and a hydraulic cylinder which applies a coulter pressure upon the tillage tools that is adjustable by a pressure valve. Further, a sensor arrangement includes at least two sensors for producing an electrical signal in connection with a total pressure acting upon the tillage tools of each row unit. In addition, an open-loop or closed-loop control device is connected to the pressure valves and the sensor arrangement and configured to adjust the coulter pressure of each row unit individually and to adapt it on the basis of the electrical signals of the sensor arrangement. In order to create a sowing machine with individual coulter pressure control that is inexpensive to manufacture, a reduced number of sensors is advantageously employed by using a functional relationship.

15 Claims, 5 Drawing Sheets

(56) References Cited

U.S. PATENT DOCUMENTS

Figure 1:
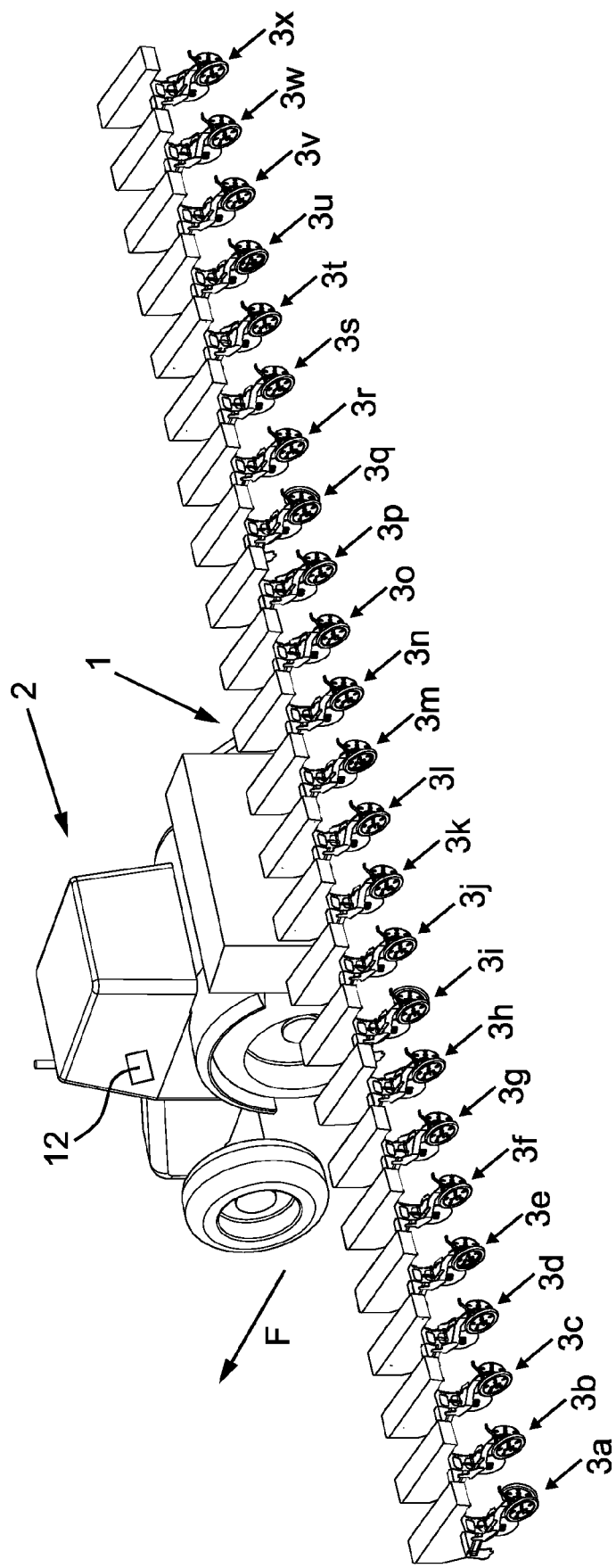

| | | | |
|---|---|---|---|
| 8,763,713 B2* | 7/2014 | Bassett | A01C 5/06 |
| | | | 111/163 |
| 10,398,076 B1* | 9/2019 | Rempel et al. | A01C 7/102 |
| 2012/0186503 A1 | 7/2012 | Sauder | |
| 2013/0032362 A1* | 2/2013 | Rylander | A01C 7/205 |
| | | | 172/1 |
| 2013/0032363 A1* | 2/2013 | Curry et al. | A01C 7/205 |
| | | | 172/4 |
| 2015/0230391 A1 | 8/2015 | Houck | |
| 2016/0165789 A1 | 6/2016 | Gervais | |
| 2017/0000005 A1 | 1/2017 | Totten et al. | |
| 2018/0208058 A1 | 7/2018 | Czapka | |

OTHER PUBLICATIONS

International Preliminary Report on Patentability issued Jun. 8, 2021 in corresponding PCT Application No. PCT/EP2019/083793.

* cited by examiner

SOWING MACHINE HAVING INDIVIDUAL COULTER PRESSURE CONTROL

The invention relates to a sowing machine. Furthermore, the invention relates to a method for individual coulter pressure control and to an open-loop or closed-loop control unit.

Such a sowing machine with automatic coulter pressure control is described in U.S. Pat. No. 8,763,713 B2. This sowing machine comprises a plurality of row units which are arranged on a frame extending transverse to the direction of travel. Such row units can be equipped with various tillage tools, such as clearing disks, furrow formers, support rollers, and/or furrow covering devices. In order to obtain, for example, an ideal depositing depth for the seeds distributed by the sowing machine, at least some of the tillage tools are subjected to a coulter pressure by way of a hydraulic cylinder. For this purpose, the hydraulic cylinders of the individual row units are connected to the hydraulic system of a farming tractor moving the sowing machine and arranged between the frame and the tillage tools in such a way that the coulter pressure acts upon the tillage tools in the direction toward the soil. In order to be able to adjust the coulter pressure for every row unit, a separate pressure valve is connected upstream of each hydraulic cylinder.

Furthermore, this sowing machine comprises a sensor arrangement which is presently formed from one sensor for every row unit. The sensors are each arranged in such a way that they are configured to produce an electrical signal corresponding to a total pressure acting upon the respective tillage tool. The total pressure acting can be seen as a measure for the depositing depth and results from the difference between, firstly, the coulter pressure that is set and, secondly, the soil counterpressure that the respective tillage tool experiences from below from the direction of the soil that it is working on. The soil counterpressure is a constantly changing variable of the soil that is worked on when driving over a field.

In addition, this sowing machine comprises an open-loop and/or closed-loop control device which is connected to the pressure valves and the sensors of the sensor arrangement in a manner conducting signals. The open-loop and/or closed-loop control device is configured to adjust the coulter pressure of each row unit individually by outputting a control signal to the pressure valve of the respective row unit that is connected upstream of the hydraulic cylinder. It is furthermore configured to adapt the set coulter pressure of each row unit on the basis of the electrical signals of the sensor arrangement. To adapt the coulter pressure, the signals received by the sensors are converted to an adapted control signal.

The drawback of this sowing machine is that at least one sensor conducting the measurement necessary for generating an adapted control signal or generating the input signal for the conversion must be provided on each row unit for this type of individual control. The number of sensors is determined by the number of row units. Since generic sowing machines comprise a plurality of row units and the sensors are costly to procure, this ultimately leads to increased production costs for the overall system.

Furthermore, sowing machines are known which implement a fundamentally different type of control, namely controlling the coulter pressure in sections. For controlling the coulter pressure in sections, the totality of the row units is subdivided into sections to form several row units, where each section comprises a sensor for detecting the total pressure acting. The signal from the sensor can also be converted into an adapted control signal which, however, is then used in representation of all row units in the section. As a result, this cannot be referred to as individual coulter pressure control for each row unit, which results in decreasing control quality and therefore to a reduced quality of work.

The object underlying the invention is therefore to create a sowing machine with individual coulter pressure control that is at the same time inexpensive to manufacture.

According to the invention, this object is satisfied in that the number of row units exceeds the number of sensors, preferably at least two-fold, particularly preferably at least six-fold, where a functional relationship between, firstly, the positioning of the individual row units on the frame and, secondly, the association of the sensors to the row units and their electrical signals produced, is stored in the memory of an open-loop and/or closed-loop control device and the open-loop and/or closed-loop control device is configured to control the coulter pressure of each row unit individually by way of the functional relationship such that the total pressure of each row unit reaches a predetermined value, at least approximately.

The invention makes use of the knowledge that the behavior of agricultural soils can be simulated by the functional relationship, at least over the width of the sowing machine. The functional relationship can be applied based on the information on, firstly, how many row units are attached to the frame and at what distance from one another and at which of these row units the total pressure is measured, i.e. where it is measured, and, secondly, how high the total pressure respectively measured is. In particular, it is taken into account at how many row units no measured value is directly recorded and at what distance the row units without an associated sensor are arranged from at least one row unit with a sensor on the frame. The sensors are preferably configured as force sensors for detecting the contact force, where the magnitude detected by the sensors, namely a force, is convertible into other variables, such as a pressure, by way of known valid relationships. To do this, the force would have to be divided by the area on which the force acts.

For this purpose, the functional relationship uses the electrical signals produced by the sensors as support points and interpolates them in a manner stored in the memory for the row units without an associated sensor. Using the functional relationship according to the invention, it is therefore possible to reduce the number of sensors required for individual coulter pressure control of each row unit and to thereby realize inexpensive manufacture of the overall system.

The open-loop and/or closed-loop control device can therefore control the coulter pressure for each row unit individually on the basis of the functional relationship, i.e. determine and adjust it by using the reduced number of real measured values and the values interpolated by way of the functional relationship for the control. The invention there also makes use of the knowledge that the measured or predicted total pressure is also a measure of the soil counterpressure that arises while the setting of the pressure valve of each row unit is known, i.e. of the coulter pressure acting upon each row unit. The three values total pressure, coulter pressure, and soil counterpressure are related to the fact that the total pressure can be calculated from the difference between the coulter pressure and the soil counterpressure.

It is there furthermore advantageous that a predetermined total pressure is obtained at least approximately at each row unit by the control and the row units therefore all operate approximately in the predetermined range. The predetermined value of the total pressure can be adjustable by the user, so that the user can, for example, determine approximately the depth at which the seeds distributed by the sowing machine are deposited.

It is provided in an advantageous embodiment of the invention that the functional relationship comprises a mathematical adjustment calculation. The total pressures to be interpolated of the row units without an associated sensor can be determined approximately in an expedient manner with the aid of the adjustment calculation on the basis of the information available. The adjustment calculation can there make use of the least squares method to minimize errors. The adjustment calculation can also be based on a graphical method, where a continuously curved mediating graph is approximated to the total pressures determined. This graph can depict the relationship between the row units arranged on the frame and the total pressure measured and/or determined. It is advantageous there that this type of functional relationship allows for flexible control for, in particular, heterogeneous soil conditions, since particularly rapid and precise adaptations can be mapped.

It is provided in a particularly advantageous embodiment of the invention that the functional relationship comprises a linear adjustment calculation. The input variables required for the individual control of the coulter pressure are there created in a particularly simple manner. It is particularly advantageous there that extremely little computing effort is required for this. This type of functional relationship is suitable for preferably homogeneous soils, which in particular exhibit no or hardly any sudden changes between different, for example hard and soft, soil areas.

It is provided in a further advantageous embodiment of the invention that the functional relationship comprises moving average values. The information available is therefore calculated to average values in an overlapping manner, where the section under consideration shifts continuously. This embodiment is characterized by the smoothing of the measured values produced by the sensors. This has the advantage that particularly large differences in amplitude between the measured values determined are attenuated, which requires fewer large adjustments to the coulter pressures that is set. The control with this type of functional relationship therefore requires lower hydraulic power to adapt the individual coulter pressures, so that operating costs are saved. It can be used advantageously for homogeneous to slightly heterogeneous soils.

The sowing machine according to the invention is also advantageously further developed in that the functional relationship comprises spline interpolation. The spline interpolation has the advantage that the total pressures measured by the sensors enter into the control almost unchanged. The spline interpolation can be formed by linear intermediate functions, i.e. as a so-called chain, where the values between at least two values measured are approximated by linear sections. The spline interpolation can be formed by intermediate functions of a higher order, for example, cubic functions. The values between at least two measured values are there approximated by single or multiple continuously differentiable sections. This further development has the advantage that, in particular, heterogeneous soil conditions can be accurately simulated.

It is provided in a further advantageous development of the invention that a plurality of different functional relationships between, firstly, the positioning of the individual row units on the frame and secondly, the association of the sensors with the row units and their electrical signals produced is stored in the memory of the open-loop and/or closed-loop control device, where the type of functional relationship used to control the individual coulter pressures of each row unit is selectable. The type of functional relationship can be selected in an automated manner by the open-loop and/or closed-loop control device. As an alternative or in addition, the open-loop and/or closed-loop control device can be part of a machine control device comprising at least one terminal unit. The terminal unit is preferably configured as a display and/or operating device, where the type of functional relationship is selectable by the user, in particular through interaction with the terminal unit. As a result of this measure, a type of functional relationship that is adapted to the type of soil of the field to be worked is selectable for a plurality of conceivable applications of the sowing machine. Consequently, the open-loop and/or closed-loop control device, i.e. the control, and/or the user are enabled by way of this further development to react flexibly to different soil conditions in order to obtain improved work results.

The sowing machine according to the invention is also advantageously further developed in that a filter is stored in the memory of the open-loop and/or closed-loop control device, where the filter is configured to compensate for the electrical signal of at least one sensor that falls below a first threshold value and/or exceeds a second threshold value. The respective signal can be compensated for in a manner known per se in various ways. To give an example: the signal can be deleted, i.e. not taken into account any further, and/or set to a value detected at a different point in time. When a tillage tool detects an obstacle in the soil, such as a stone, or when a tillage tool is moved through a puddle of water, the sensor registers a disproportionately high or low total pressure for the row unit with which this tillage tool is associated. Such locally occurring anomalies can be recognized by suitably determining the first and the second threshold value. It is advantageous there that such so-called outliers are processed in a suitable manner, so that controlling the remaining row units is almost unaffected by outliers.

The object underlying the invention is furthermore satisfied by a method for individually controlling a plurality of coulter pressures. Each coulter pressure acts upon the respective tillage tools of a row unit of a sowing machine. The coulter pressure is produced at each row unit by a hydraulic cylinder and is set by way of a pressure valve connected upstream of the hydraulic cylinder. Furthermore, total pressures acting upon at least two row units are each detected by a sensor arrangement. The sensor arrangement therefore comprises at least two sensors each for detecting the total pressure acting upon the tillage tools of a row unit. In addition, the number and the positioning of the individual row units and on which of these row units' total pressures are detected is known and an open-loop and/or closed-loop control unit is connected in a manner conducting signals to at least the pressure valves and the sensor arrangement. The method according to the invention comprises evaluating the total pressures detected, interpolating by way of a functional relationship between, firstly, the positioning of the individual row units on and, secondly, the total pressures detected and evaluated, determining individual coulter pressures for all row units based on the functional relationship applied, as well as adjusting the individual coulter pressures. The method according to the invention is repeated continuously at temporal intervals and with the aim that each row unit experiences approximately a predetermined total pressure.

When evaluating the total pressures, their magnitudes are determined and processed as values in the control. Furthermore, it is verified in particular whether the total pressures detected correspond at least approximately to the total pressures last detected. For the reason that the distances are known between all row units on the frame as well as where the total pressures were recorded, the functional relationship with the current values of the total pressure can be applied. The functional relationship simulates the behavior of the soil and is then used to interpolate the values of the total pressure of the row units with the associated sensor to the row units without an associated sensor. The interpolation therefore generates approximated values of the total pressure for the row units with and without an associated sensor according to the manner of the functional relationship. Individual coulter pressures for all row units are subsequently determined and set on the basis of this interpolation, so that a possible difference between the detected or approximated total pressures and a predetermined total pressure are compensated for to the extent possible. The above steps are preferably carried out using the open-loop and/or closed-loop control device and/or by the open-loop and/or closed-loop control device itself.

It is provided in a further development of the method according to the invention that the total pressures detected and evaluated serve as support points when the functional relationship is applied and interpolation takes place between and/or next to the support points by way of the functional relationship. The total pressures detected and evaluated are particularly advantageously suitable as support points for the approximation of the expected values of the row units without a separate associated sensor, since they can provide particularly reliable information about the real soil conditions. Furthermore, tendencies can be derived by way of the support points for approximating the behavior of the soil as accurately as possible. In addition, the distance between a row unit, for which the total pressure was detected and evaluated, which therefore forms a support point, and at least one row unit, for which the total pressure is predicted, can be taken into account for the interpolation. As a result, the support points, by themselves and when viewed together, serve to simulate the expected behavior of the soil as expediently as possible.

In a further embodiment of the method according to the invention, a type of functional relationship is selected in an automated manner or manually from a plurality of different functional relationships. The automated selection can be made by the open-loop and/or closed-loop control unit. In addition, the open-loop and/or closed-loop control device can be configured as a terminal unit within a machine control system. The open-loop and/or closed-loop control device is then preferably created having a display and/or operating device, where the type of functional relationship is selected by the user by way of the display and/or the operating device. Since the types of functional interrelationships can differ in terms of their suitability for simulating the behavior of different types of soil, this embodiment allows for a flexible response to the specific application. The user knows the areas to be cultivated and can select from the number of available types of functional relationships the suitable one. It is also conceivable that the open-loop and/or closed-loop control device selects the suitable type of functional relationship, for example, on the basis of the total pressures detected and, in particular, their temporal courses. Frequent and/or large differences in the total pressures measured can be an indication of heterogeneous soil conditions.

It is verified in a further advantageous development of the method whether at least one of the total pressures detected falls below a first threshold value and/or exceeds a second threshold value. In order to recognize outliers and to process them appropriately, it is advantageous to have the first threshold value represent a lower limit of the total pressure and the second threshold value represent an upper limit of the total pressure. Should the total pressure detected be beyond these limits, i.e. outside the range of proper operation covered by the first and the second threshold value, then it is provided to process this total pressure separately. The total pressure which falls below the first threshold value or exceeds the second threshold value is compensated for prior to the functional relationship being applied. In this way, the outlier is returned to a value that is within the range of proper operation or is deleted, so that the negative influence of outliers is reduced.

The object underlying the invention is furthermore satisfied by an open-loop and/or closed-loop control unit for a sowing machine. The sowing machine comprises a plurality of row units, where the row units are arranged on a frame extending transverse to the direction of travel and each comprise tillage tools and a hydraulic cylinder that applies a coulter pressure upon the tillage tools, where the coulter pressure acting upon the tillage tools is adjustable by way of a pressure valve upstream of each hydraulic cylinder, and a sensor arrangement which comprises at least two, preferably at least three or more sensors which are each configured to produce an electrical signal in connection with a total pressure acting upon the tillage tools of a row unit, in particular from the difference between the coulter pressure and a soil counterpressure. The open-loop and/or closed-loop control unit is connected to the pressure valves and the sensor arrangement and is configured to carry out the method for individually controlling a plurality of coulter pressures according to one of the above embodiments.

Regarding the advantages and modifications of the open-loop and/or closed-loop control unit according to the invention, reference is made to the advantages and modifications of the method according to the invention.

Figure 3:
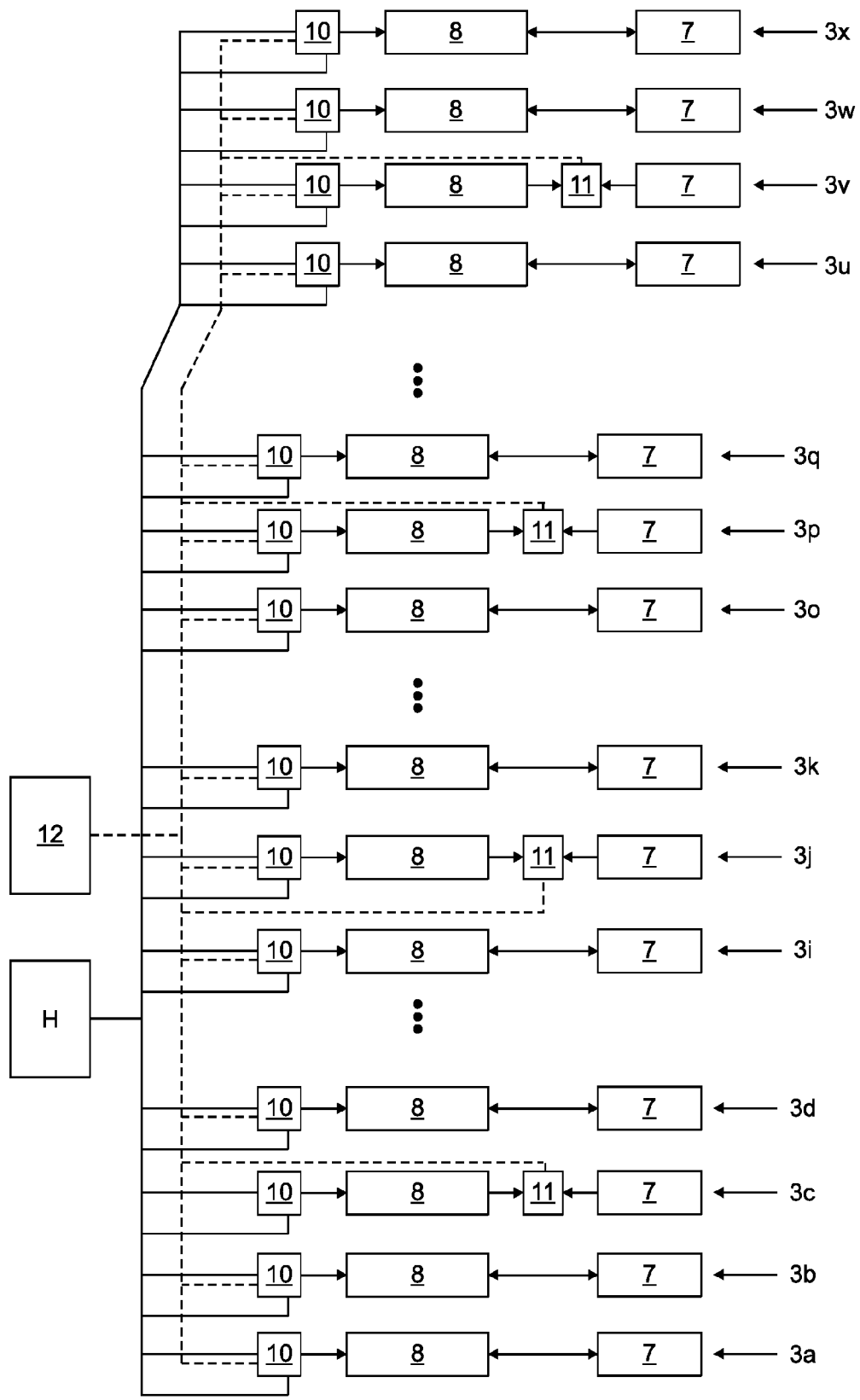
Figure 4:
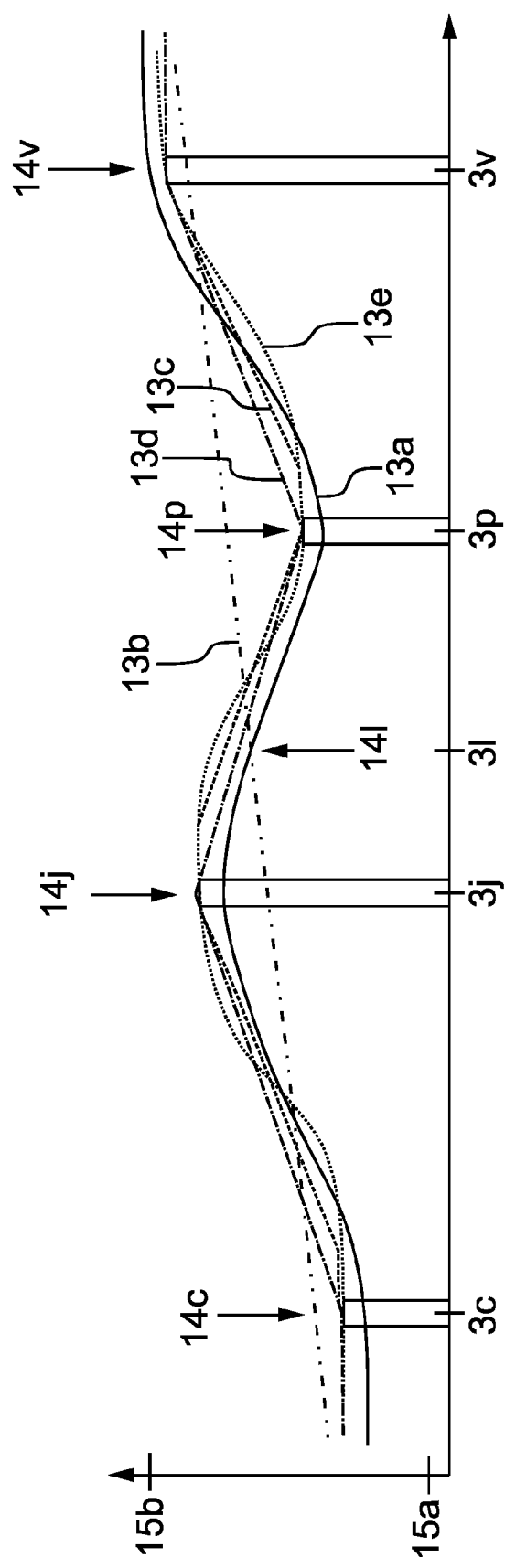
Figure 5:
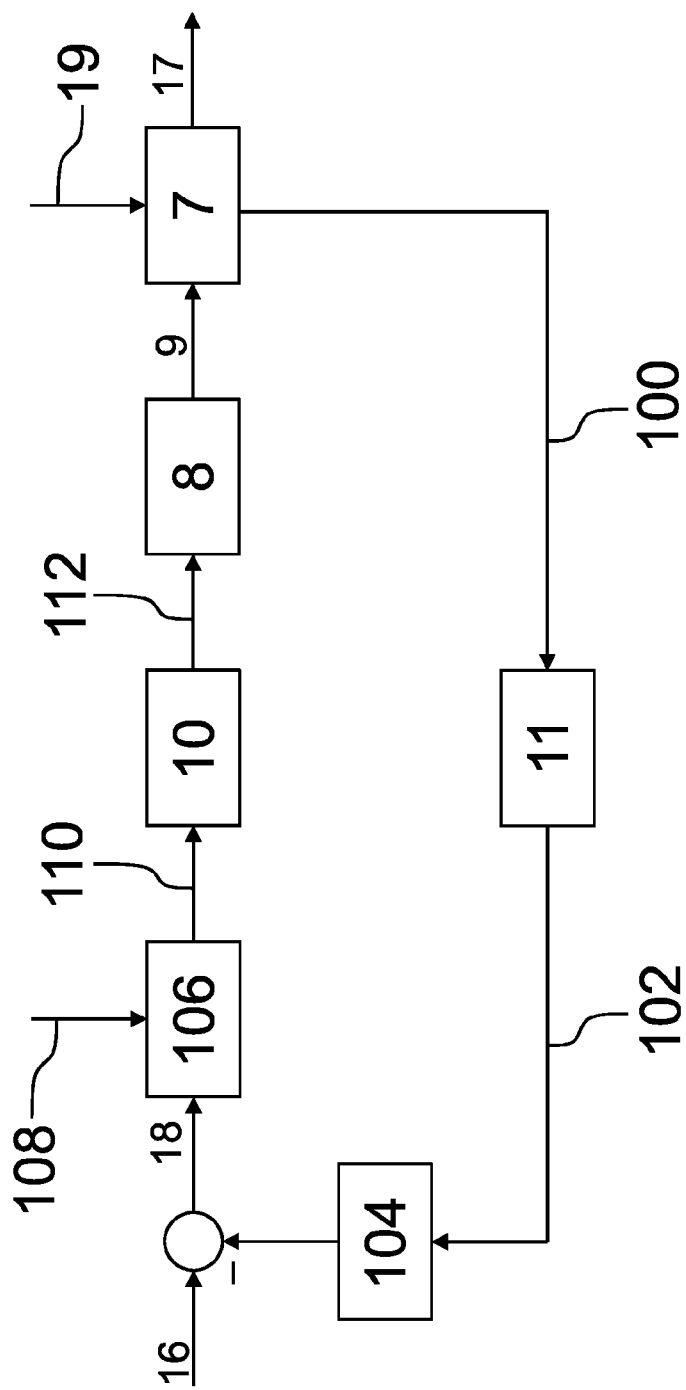

Further details of the invention can be gathered from the description of the examples and the drawings. In these drawings FIG. 1 shows a sowing machine attached behind a farming tractor in a perspective view, FIG. 2 shows a side view of a row unit detached from the sowing machine, FIG. 3 shows a functional diagram of the sowing machine, FIG. 4 shows a diagram with various functional relationships, and FIG. 5 shows an embodiment of the method according to the invention in a schematic representation.

FIG. 1 shows a sowing machine 1 embodied as a single grain sowing machine which is attached behind a farming tractor 2 and can therefore move with farming tractor 2 in direction of travel F. Sowing machine 1 comprises a plurality of row units 3a-3x arranged transverse to direction of travel F on a frame unit. Row units 3a-3x are presently shown in their operating position arranged next to one another. The frame can be configured to be foldable or foldable and/or telescopic so that row units 3a-3x can be made to assume a transport position of reduced width.

Figure 2:
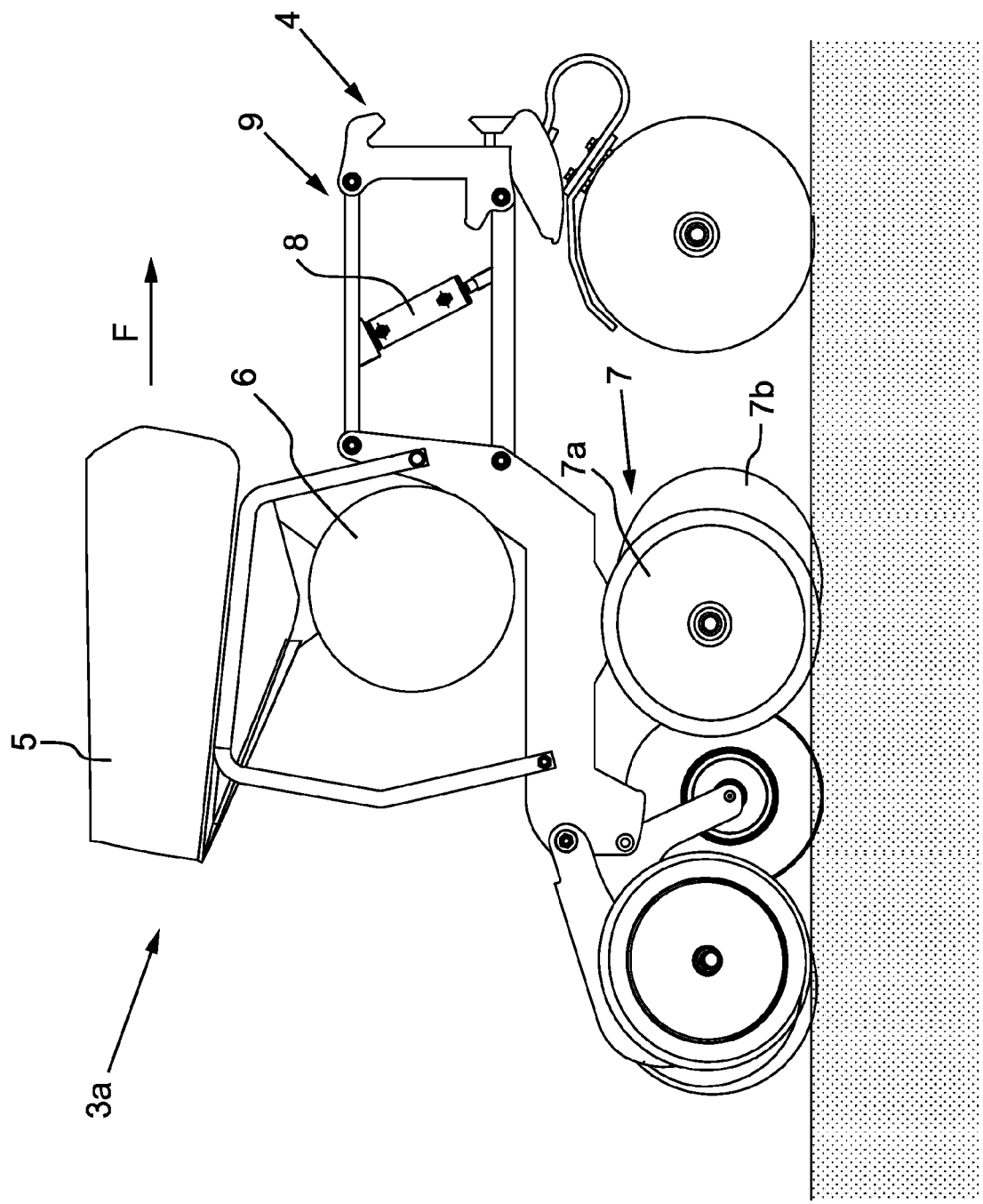

One of row units 3a-3x is shown in representation in FIG. 2 in a position detached from the frame. This row unit 3a comprises a mounting flange 4, which in direction of travel F is at the leading end, by way of which it is arranged on the frame (presently not shown). Provided at the upper end of row unit 3a is a storage container 5 for seeds. The seeds are delivered from storage container 5 to a separating device 6, which in turn separates the seeds in a manner known per se and delivers them to tillage tools 7 of row unit 3a via concealed distribution lines. Tillage tools 7 are presently configured as support rollers 7a, as well as cutting disks 7b surrounded by two support rollers 7a arranged on both sides and therefore concealed at least in part, and furrow formers arranged in a concealed manner between the cutting disks. The separated seeds are worked into the soil at tillage tools 7 so that their depth of penetration into the soil influences the placement depth of the seeds and therefore their development and the work result. The aim is therefore to keep the penetration depth as constant as possible in an adjustable manner. However, since very different soil counterpressures of agricultural soils sometimes act upon tillage tools 7, a hydraulic cylinder 8 is provided for counteracting the soil counterpressure. Hydraulic cylinder 8 is connected in a fluid-conducting manner to a pressure source by way of hoses (presently not shown).

Hydraulic cylinder 8 applies a so-called coulter pressure upon tillage tools 7 by way of a parallelogram mechanism 9 connected to mounting flange 4. Hydraulic cylinder 8 is therefore configured to effect a motion of row unit 3a-3x relative to the frame by way of parallelogram mechanism 9, so that tillage tools 7 are acted upon with increased pressure when moving towards the ground, or reduced pressure when moving away from the ground.

The coulter pressure generated by hydraulic cylinder 8, i.e. acting upon tillage tools 7, is adjustable by way of a pressure valve 10 connected upstream of hydraulic cylinder 8 on each row unit 3a-3x, as is also shown in FIG. 3. Furthermore, a sensor arrangement, consisting of a total of four sensors 11, of sowing machine 1 is shown in FIG. 3. Sensors 11 can be force sensors which are customary per se, the detected variable of which can be converted, for example, using known relationships, into a pressure. For this purpose, the force can be divided by the known area on which it acts. Sensors 11 are each configured to detect the total pressure acting upon tillage tools 7 of row unit 3a-3x with which they are associated, presently row units 3c, 3j, 3p, 3v, in particular from the difference between the coulter pressure and the soil counterpressure. Sensors 11 generate an electrical signal corresponding to the detecting total pressure and are connected in a manner conducting signals to an open-loop and/or closed-loop control device configured as a terminal unit 12. Terminal unit 12 is further in signal connection with pressure valves 10 and is configured to adjust the coulter pressure of each row unit 3a-3x individually and to adapt it based on the electrical signals of the sensor arrangement. Terminal unit 12 also serves as a display and/or operating device and is arranged in the driver's cabin of farming tractor 2, as shown in FIG. 1. Hydraulic cylinders 8 are in fluid connection via pressure valves 10 with a hydraulic system H comprising the pressure source. Hydraulic system H can be made available by farming tractor 2.

A plurality of different functional relationships 13a-13e is stored in a memory of terminal unit 12 for controlling the coulter pressure of each row unit 3a-3x individually by way of terminal unit 12 such that the total pressure, and therefore approximately the penetration depth, of each row unit 3a-3x reaches at least approximately a predetermined value, although a separate sensor 11 is provided on only four of row units 3a-3x for measuring the real total pressure. As illustrated be the diagram in FIG. 4, functional relationship 13a-13e maps the relationship between, firstly, the positioning of individual row units 3a-3x on the frame, plotted over the horizontal axis and, secondly, the association of sensors 11 to row units 3a-3x as well as their electrical signals produced, i.e. the total pressure measured plotted over the vertical axis. All values 14a-14x of the total pressure can be determined on the basis of functional relationship 13a-13e so that terminal unit 12 can control the coulter pressure based thereupon to compensate for any difference between the preset desired total pressure and the total pressure of each row unit 3a-3x determined in this manner.

Functional relationship 13a-13e can be implemented as a mathematical adjustment calculation 13a, a linear adjustment calculation 13b, moving average values 13c, linear spline interpolation 13d, or cubic spline interpolation 13e. Functional relationships 13a-13e therefore differ with regard to the way in which values 14a-14x of the total pressure are determined from the information available and are stored in a memory of terminal unit 12. In order to react to different soil conditions and/or types of soil, the user can select on terminal unit 12 the type of functional relationship 13a-13e used for the approximation. In the alternative or in addition, it is conceivable that at least one suitable functional relationship 13a-13e is proposed or selected in an automated manner by the terminal unit. For example, value 14l of the total pressure determined for row unit 3l by way of mathematical adjustment calculation 13a or linear adjustment calculation 13b can be read in the diagram at the intersection of the two graphs in FIG. 4, at this point at the bottom. Differently determined values 14l of the total pressure are disposed vertically thereabove.

Since agricultural soils sometimes have locally occurring anomalies and the total pressures which are consequently unusable for controlling, so-called outliers, are detected at tillage tools 7, it is expedient for a filter to be stored in the memory of terminal unit 12. The filter ensures that electrical signals produced in representation of the total pressure measured, which fall below a first threshold value forming a lower limit 15a or exceed a second threshold value forming an upper limit 15b, are compensated for. Compensated signals are not included in the application of functional relationships 13a-13e so that the latter are not falsified upwards or downwards.

FIG. 5 shows schematically the sequence of the method for the individual control of the plurality of coulter pressures acting upon tillage tools 7 of row units 3a-3x of sowing machine 1. Reference variable 16 of the closed loop is formed by the predetermined total pressure. It can be adjusted by the user by way of terminal unit 12. Control variable 17 in this case is the penetration depth of tillage tools 7 of each row unit 3a-3x. It is ideally constant at least approximately for all row units 3a-3x. For this purpose, the total pressure upon tillage tools 7 of row units 3c, 3j, 3p, 3v is measured in the feedback in the case of above-described sowing machine 1 in step 100 by way of sensors 11. The total pressures detected are evaluated in step 102 so that values 14c, 14j, 14p, 14v of the total pressure result. It is verified in step 104 whether at least one of the total pressures detected and evaluated falls below lower limit 15a or exceeds upper limit 15b. Total pressures for which this applies are referred to as outliers and are compensated for in step 104 in the manner described above.

Control deviation 18 results from the comparison of the total pressures processed in this manner to reference variable 16, the predetermined total pressure. Interpolation takes place in step 106 by way of one of functional relationships 13a-13e, the type of which was selected in step 108 in an automated manner by terminal unit 12 or manually by the user. Detected and evaluated values 14c, 14j, 14p, 14v of the total pressure serve as support points for functional relationship 13a-13e, and approximation takes place via the support points. This means that selected functional relationship 13a-13e is applied to the available information in order to predict the total pressures of each row unit 3a-3x. Functional relationship 13a-13e there takes into account at which distance from each other row units 3a-3x are arranged on the frame and where the total pressures used for the current control loop were recorded, as well as which values 14c, 14j, 14p, 14v they have. It arises from the situation illustrated by FIG. 4: Each row unit 3a-3x can be associated with a value 14a-14x of the total pressure by way of one or more of functional relationships 13a-13e. In order to compensate for any differences between the preset total pressure and values 14a-14x determined in this manner, individual coulter pressures are determined in step 110 for all row units 3a-3x and sent from terminal unit 12 as a signal to respective pressure valves 10. Of course, the same coulter pressures can there be determined for two or more row units 3a-3x; an individual signal is generated for each row unit 3a-3x.

The individual coulter pressures determined in step 110 are set by pressure valves 10 in step 112 at hydraulic cylinders 8, from where they are applied upon tillage tools 7 by way of parallelogram mechanisms 9. The soil counterpressure, which is included as a disturbance variable 19, also acts upon tillage tools 7. With this sowing machine 1, the above method is carried out continuously and repeatedly by the open-loop and/or closed-loop control unit configured as a terminal unit 12, so that sowing machine 1 achieves the best possible work results on all types of soils and under changing soil conditions.

LIST OF REFERENCE CHARACTERS

1 sowing machine
2 farming tractor
F direction of travel
3a-3x row unit
4 mounting flange
5 storage container
6 separating device
7 tillage tool
7a support roller
7b cutting disk
8 hydraulic cylinder
9 parallelogram mechanism
10 pressure valve
11 sensor
12 terminal unit
H hydraulic system
13a-13e functional relationship
13a mathematical adjustment calculation
13b linear adjustment calculation
13c moving averages
13d linear spline interpolation
13e cubic spline interpolation
14a-14x value (of the total pressure)
15a lower limit
15b upper limit
16 reference variable
17 control variable
100-112 step
18 control deviation
19 disturbance variable

The invention claimed is:

1. A sowing machine, comprising:
a plurality of row units, where said row units are arranged on a frame extending transverse to a direction of travel, each of the row units comprising tillage tools and a hydraulic cylinder that applies a coulter pressure upon said tillage tools, where the coulter pressure acting upon said tillage tools is adjustable by a pressure valve connected upstream of each said hydraulic cylinder and where each row unit of said row units has a total pressure that acts upon said tillage tools of a respective row unit of said row units,
a sensor arrangement which comprises at least two sensors which are each configured to produce an electrical signal in connection with a corresponding total pressure acting upon said tillage tools of a respective one of the row units,
an open-loop or closed-loop control device which is connected to said pressure valves and said sensor arrangement and is configured to adjust the coulter pressure of each of the row units individually,
wherein a number of the row units exceeds a number of the sensors such that a functional relationship between positioning of said row units on said frame and an association of said sensors with said row units and the electrical signals produced is stored in a memory of the open-loop or closed-loop control device and said open-loop or closed-loop control device is configured to control the coulter pressure of each of the row units individually by said functional relationship such that each total pressure of each row unit of said row units reaches a predetermined value, and
wherein said functional relationship comprises a spline interpolation.

2. The sowing machine according to claim 1, wherein said functional relationship comprises a mathematical adjustment calculation.

3. The sowing machine according to claim 2, wherein said functional relationship comprises a linear adjustment calculation.

4. The sowing machine according to claim 1, wherein said functional relationship comprises moving average values.

5. The sowing machine according to claim 1, wherein a plurality of different functional relationships between the positioning of said row units on said frame and the association of said sensors with said row units and the electrical signals produced is stored in said memory of said open-loop or closed-loop control device, such that a type among the plurality of different functional relationships is selectable to control the coulter pressures of each of the row units.

6. The sowing machine according to claim 1, wherein a filter is stored in said memory of said open-loop or closed-loop control device, such that said filter is configured to compensate for said electrical signal of at least one of the sensors which falls below a first threshold value or exceeds a second threshold value.

7. The sowing machine of claim 1, wherein the electrical signal corresponds to a difference between the coulter pressure and a soil counterpressure.

8. The sowing machine according to claim 1, wherein the number of the row units exceeds the number of the sensors by at least two fold.

9. The sowing machine according to claim 1, wherein the number of the row units exceeds the number of the sensors by at least six fold.

10. A method for individually controlling a plurality of coulter pressures, each acting upon tillage tools of a row unit of a sowing machine, where each of the coulter pressures is adjustable for each of the row units by a pressure valve positioned upstream of a hydraulic cylinder acting upon said tillage tools and total pressures acting upon at least two of the row units are each detected by a sensor arrangement, where a number and positioning of said row units and at which of the row units the total pressures are detected is known, and an open-loop or closed-loop control unit is connected in a manner for conducting signals to at least said pressure valves and said sensor arrangement, comprising the steps of:

evaluating the total pressures detected, interpolating by a functional relationship between the positioning of said row units and the total pressures detected and evaluated, the functional relationship including a spline interpolation, determining the coulter pressures for all of the row units based on said functional relationship applied, and adjusting the coulter pressures.

11. The method according to claim 10, wherein the total pressures detected and evaluated serve as support points when said functional relationship is applied and interpolation takes place between or next to the support points by said functional relationship.

12. The method according to claim 10, wherein a type of the functional relationship is selected in an automated manner or manually from a plurality of different functional relationship types.

13. The method according to claim 10, further comprising at least one of the following steps:

verifying whether at least one of the total pressures detected falls below a first threshold value or exceeds a second threshold value, compensating for the at least one total pressure which falls below said first threshold value or exceeds said second threshold value prior to said functional relationship being applied.

14. An open-loop or closed-loop control unit for a sowing machine, where said sowing machine comprises a plurality of row units, where said row units are arranged on a frame extending transverse to a direction of travel and each of said row units comprises tillage tools and a hydraulic cylinder that applies a coulter pressure upon said tillage tools, where the coulter pressure acting upon said tillage tools is adjustable by a pressure valve positioned upstream of each said hydraulic, and a sensor arrangement which comprises at least two, sensors which are each configured to produce an electrical signal in connection with a total pressure acting upon said tillage tools of a respective one of the row units, where said open-loop or closed-loop control unit is connected to said pressure valves and said sensor arrangement, wherein said open-loop or closed-loop control unit is configured to:

evaluate the total pressures detected, interpolate by a functional relationship between the positioning of said row units and the total pressures detected and evaluated, the functional relationship including a spline interpolation, determine the coulter pressures for all of the row units based on said functional relationship applied, and adjust the coulter pressures.

15. The control unit according to claim 14, wherein the electrical signal corresponds to a difference between the coulter pressure and a soil counterpressure.

\* \* \* \* \*